United States Patent
Kim et al.

(10) Patent No.: US 11,502,505 B2
(45) Date of Patent: Nov. 15, 2022

(54) METHOD FOR CONTROLLING AT LEAST ONE PIN INCLUDED IN INTERFACE SO AS TO SWITCH TO OPEN STATE IN RESPONSE TO MOISTURE DETECTION AND ELECTRONIC DEVICE FOR PERFORMING SAME

(71) Applicant: Samsung Electronics Co., Ltd., Suwon-si (KR)

(72) Inventors: Kyoungwon Kim, Suwon-si (KR); Wonseok Kang, Suwon-si (KR); Kwangyeol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/267,009

(22) PCT Filed: Aug. 1, 2019

(86) PCT No.: PCT/KR2019/009637
§ 371 (c)(1),
(2) Date: Feb. 8, 2021

(87) PCT Pub. No.: WO2020/032483
PCT Pub. Date: Feb. 13, 2020

(65) Prior Publication Data
US 2021/0305805 A1 Sep. 30, 2021

(30) Foreign Application Priority Data

Aug. 8, 2018 (KR) ........................ 10-2018-0092617

(51) Int. Cl.
*H02H 5/08* (2006.01)
*H02H 1/00* (2006.01)
*G06F 13/42* (2006.01)

(52) U.S. Cl.
CPC .......... *H02H 5/083* (2013.01); *H02H 1/0007* (2013.01); *G06F 13/4282* (2013.01); *G06F 2213/0042* (2013.01)

(58) Field of Classification Search
CPC .. H02H 5/083; H02H 1/0007; G06F 13/4282; G06F 2213/0042
See application file for complete search history.

(56) References Cited

U.S. PATENT DOCUMENTS

2010/0033883 A1* 2/2010 Simon .................... H02H 5/083
361/52
2011/0104940 A1 5/2011 Rabu et al.
(Continued)

FOREIGN PATENT DOCUMENTS

KR          10-1503023 B1    3/2015
KR     10-2018-0024793 A     3/2018
(Continued)

OTHER PUBLICATIONS

International Search Report dated Nov. 8, 2019 in connection with International Patent Application No. PCT/KR2019/009637, 2 pages.
(Continued)

*Primary Examiner* — Scott Bauer

(57) ABSTRACT

An electronic device according to various embodiments of the present invention may comprise: a housing; an interface connected to the housing or exposed through the housing and comprising at least one configuration channel (CC) pin; a circuit disposed inside the housing, comprising a current generator and a comparator, and electrically connected to the interface; a processor disposed inside the housing and operatively connected to the interface and the circuit; and a memory operatively connected to the processor. The memory cause the processor, when executed, to detect moisture corresponding to the at least one CC pin on the basis of the comparator while the at least one CC pin is (Continued)

connected to the current generator and to control at least one switch disposed between the current generator and the at least one CC pin, in response to detection of the moisture, thereby conducting switching such that the at least one CC pin is not connected to the current generator. Other embodiments are also possible.

15 Claims, 15 Drawing Sheets

(56) References Cited

U.S. PATENT DOCUMENTS

| | | |
|---|---|---|
| 2018/0062325 A1 | 3/2018 | Kim |
| 2018/0113832 A1 | 4/2018 | Baek et al. |
| 2018/0181509 A1 | 6/2018 | Jo |
| 2018/0269676 A1* | 9/2018 | Lo .................. G01N 27/226 |
| 2019/0123494 A1 | 4/2019 | Gustafsson |

FOREIGN PATENT DOCUMENTS

| | | |
|---|---|---|
| KR | 10-2018-0044602 A | 5/2018 |
| KR | 10-2018-0074370 A | 7/2018 |
| WO | 2017/180046 A1 | 10/2017 |

OTHER PUBLICATIONS

Written Opinion of the International Searching Authority dated Nov. 8, 2019 in connection with International Patent Application No. PCT/KR2019/009637, 5 pages.

* cited by examiner

METHOD FOR CONTROLLING AT LEAST ONE PIN INCLUDED IN INTERFACE SO AS TO SWITCH TO OPEN STATE IN RESPONSE TO MOISTURE DETECTION AND ELECTRONIC DEVICE FOR PERFORMING SAME

CROSS-REFERENCE TO RELATED APPLICATIONS

This application is a 371 of International Application No. PCT/KR2019/009637 filed on Aug. 1, 2019, which claims priority to Korean Patent Application No. 10-2018-0092617 filed on Aug. 8, 2018, the disclosures of which are herein incorporated by reference in their entirety.

BACKGROUND

1. Field

Various embodiments of the disclosure relate to a method for controlling at least one pin included in an interface so as to switch to an open state upon detecting moisture and an electronic device for performing the same. Specifically, various embodiments of the disclosure relate to a method for controlling an electronic device to prevent corrosion due to detected moisture when the moisture is detected in an interface (e.g., a connecting terminal) of the electronic device.

2. Description of Related Art

Recent development of electronic communication industries has been followed by rapidly increasing use of portable electronic devices. Examples of such portable electronic devices include a mobile communication terminal for communication, a personal digital assistant (PDA), a smartphone, a tablet PC, an MP3 player, a laptop PC, a digital camera, a wearable device, and other various electronic devices that can be used freely on the move with no place-related restrictions.

Various electronic devices are recently equipped with ports (for example, connecting terminals) such that external electronic devices are connected thereto in a wired manner. The ports are specified according to various standards. Among such various standards, the universal serial bus (UBS) type is the most widely used standard.

The USB refers to an input/output standard type used to connect an electronic device and an external electronic device, and is utilized variously.

A portable electronic device may have a waterproofing function such that the same can be used freely on the move with no place-related restrictions. The portable electronic device may be exposed to water while being carried in some situations. Particularly, and ports (for example, interfaces or connecting terminals) for connecting with an external device may be elements directly exposed to water.

According to the prior art, the voltage (Vbus) applied to the electronic device is periodically dropped, based on the D+/D− data terminal included in the interface, such that corrosion due to moisture remaining in the interface can be prevented.

Type-C interfaces that correspond to USB Type-C specifications may include no D+/D− data terminals. In the case of an electronic device provided with a Type-C interface, it may be difficult to periodically drop the applied voltage due to the absence of D+/D− data terminals. In addition, in the case of the electronic device provided with the Type C interface, it may be difficult to prevent corrosion of the interface due to moisture in a situation in which the same is exposed to moisture.

SUMMARY

An electronic device according to various embodiments of the disclosure may include: a housing; an interface configured to be connected to the housing or to be exposed through the housing, and to include at least one configuration channel (CC) pin; a circuit configured to be disposed in the housing, to include a current generator and a comparator, and to be electrically connected to the interface; a processor configured to be disposed in the housing and to be operatively connected to the interface and the circuit; and a memory configured to be operatively connected to the processor. The memory may, when executed, cause the processor to: detect moisture corresponding to the at least one CC pin based on the comparator in a state in which the at least one CC pin is connected to the current generator; and switch the at least one CC pin not to be connected with the current generator by controlling at least one switch disposed between the current generator and the at least one CC pin upon detecting the moisture.

An external electronic device according to various embodiments of the disclosure may include: a connector configured to be electrically connectable corresponding to at least one CC pin included in an interface of an electronic device; a circuit configured to be electrically connected to the connector; and a processor configured to be operatively connected to the connector and the circuit. The processor may measure an electrical signal corresponding to the at least one CC pin of the electronic device and may determine whether to supply a voltage to the electronic device in response to the measured electrical signal.

An operating method of an electronic device according to various embodiments of the disclosure may include: detecting moisture corresponding to at least one CC pin included in an interface based on a comparator included in a circuit electrically connected to the interface in a state in which the at least one CC pin is connected to a current generator; controlling at least one switch disposed between the current generator and the at least one CC pin upon detecting the moisture; and switching the at least one CC pin not to be connected with the current generator.

An electronic device according to various embodiments of the disclosure may have a Type-C interface and may detect moisture based on at least one terminal (for example, CC terminal or SBU terminal) included in the Type-C interface. The electronic device may switch the CC terminal to an open state in response to moisture detection, and no voltage may be applied from an external device since the CC terminal is switched to the open state. According to various embodiments, corrosion due to moisture can be prevented because no voltage is applied form the external device.

An electronic device according to various embodiments of the disclosure may provide a user with a notification according to a state in which moisture is detected, or a state in which an external device is inserted therein. The notification may be a notification message displayed such that the electronic device and the external device are separated. According to various embodiments, moisture may be evaporated, without corrosion resulting from an electric signal, since the electronic device and the external device are separated. Various other advantageous effects inferable directly or indirectly form this document may be provided.

DETAILED DESCRIPTION

Figure 1:
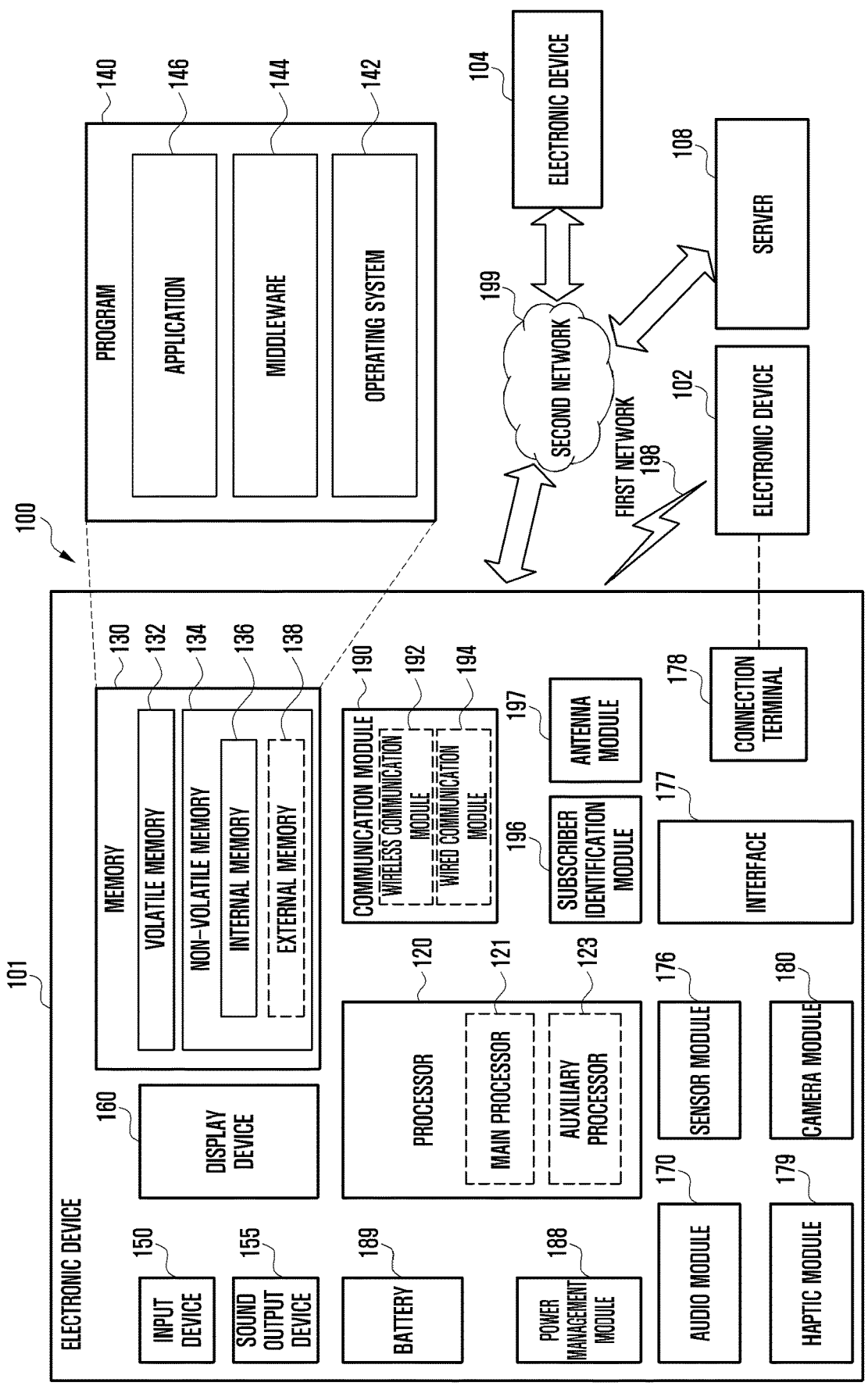
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 (e.g., DRAM, SRAM, or SDRAM) or the non-volatile memory 134.

The program 140 may be stored in the memory 130 as software, and may include, for example, an operating system (OS) 142, middleware 144, or an application 146 (e.g., application program).

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface. According to an embodiment, the interface 177 may include a Type-C interface (e.g., a Type-C connecting terminal) corresponding to the USB Type-C standard. According to various embodiments of the disclosure, the electronic device 101 may be connected with an external electronic device using a USB Type-C connector. For example, the external electronic device may be a charging device, and the electronic device 101 may receive a voltage from the charging device and may charge the battery 189 based on the received voltage.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
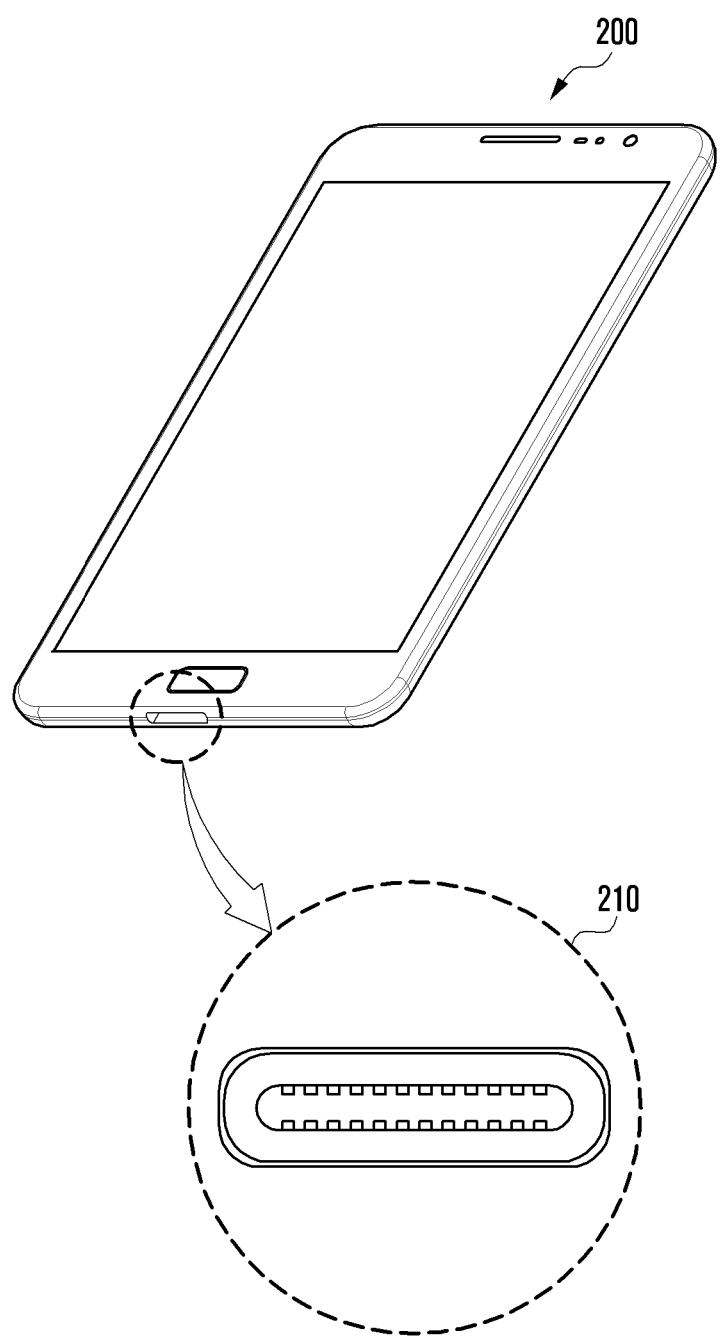
FIG. 2 illustrates an interface of an electronic device according to various embodiments.

FIG. 2 illustrates an interface of an electronic device according to various embodiments.

According to various embodiments, the electronic device 200 (e.g., the electronic device 101 of FIG. 1) may be configured as, but not limited to, a portable electronic device, such as a smartphone and a tablet PC, and may include a connector 210 (e.g., the interface 177 of FIG. 1 or the connecting terminal 178 of FIG. 1) to which an external electronic device is connectable. According to an embodiment, the electronic device 200 may be connected with an external electronic device through the connector 210 and may transmit or receive data (e.g., multimedia data including audio data, a control command, or the like) to or from the connected external electronic device. According to an embodiment, when the connected external electronic device is a charging device (e.g., a charger), the electronic device 200 may receive a voltage from the external electronic device to charge a battery (e.g., the battery 189 of FIG. 1).

According to various embodiments, the electronic device 200 may include an opening formed on one surface of a housing and a hole extending from the opening, and the connector 210 may be disposed in the hole. As illustrated in FIG. 2, the opening and the hole are formed in a lower surface of the housing of the electronic device 200, and the connector 210 may be disposed therein. However, a position in which the connector 210 is disposed is not limited to this illustration, and the connector 210 may be disposed on another surface of the housing of the electronic device 200.

Figure 3A:
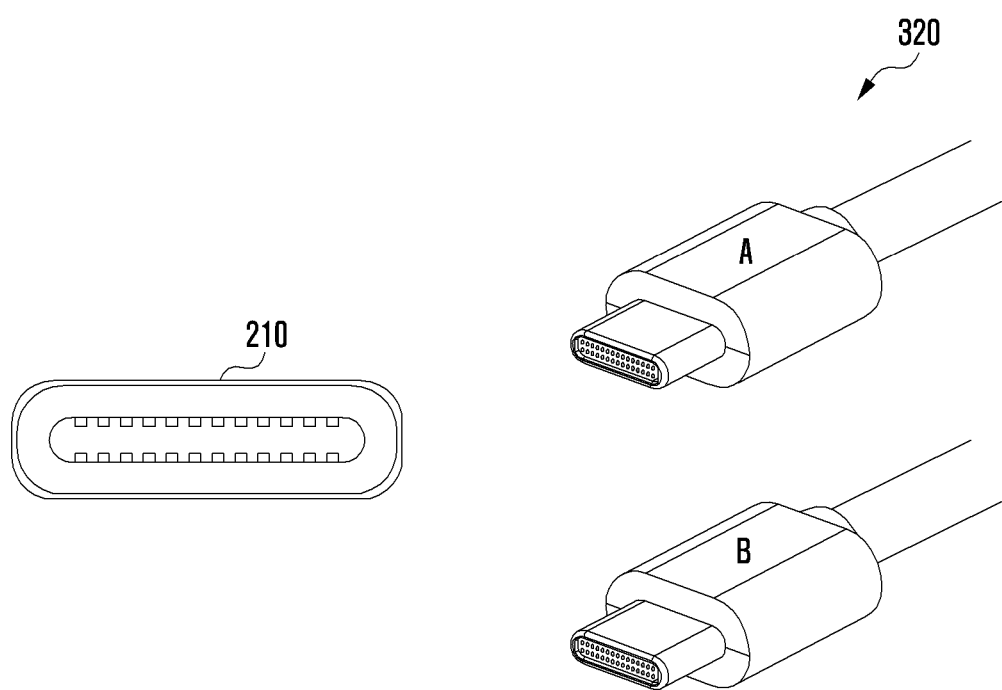
FIG. 3A to FIG. 3B illustrate a connector of an electronic device and the pin structure of the connector according to various embodiments.
Figure 3B:
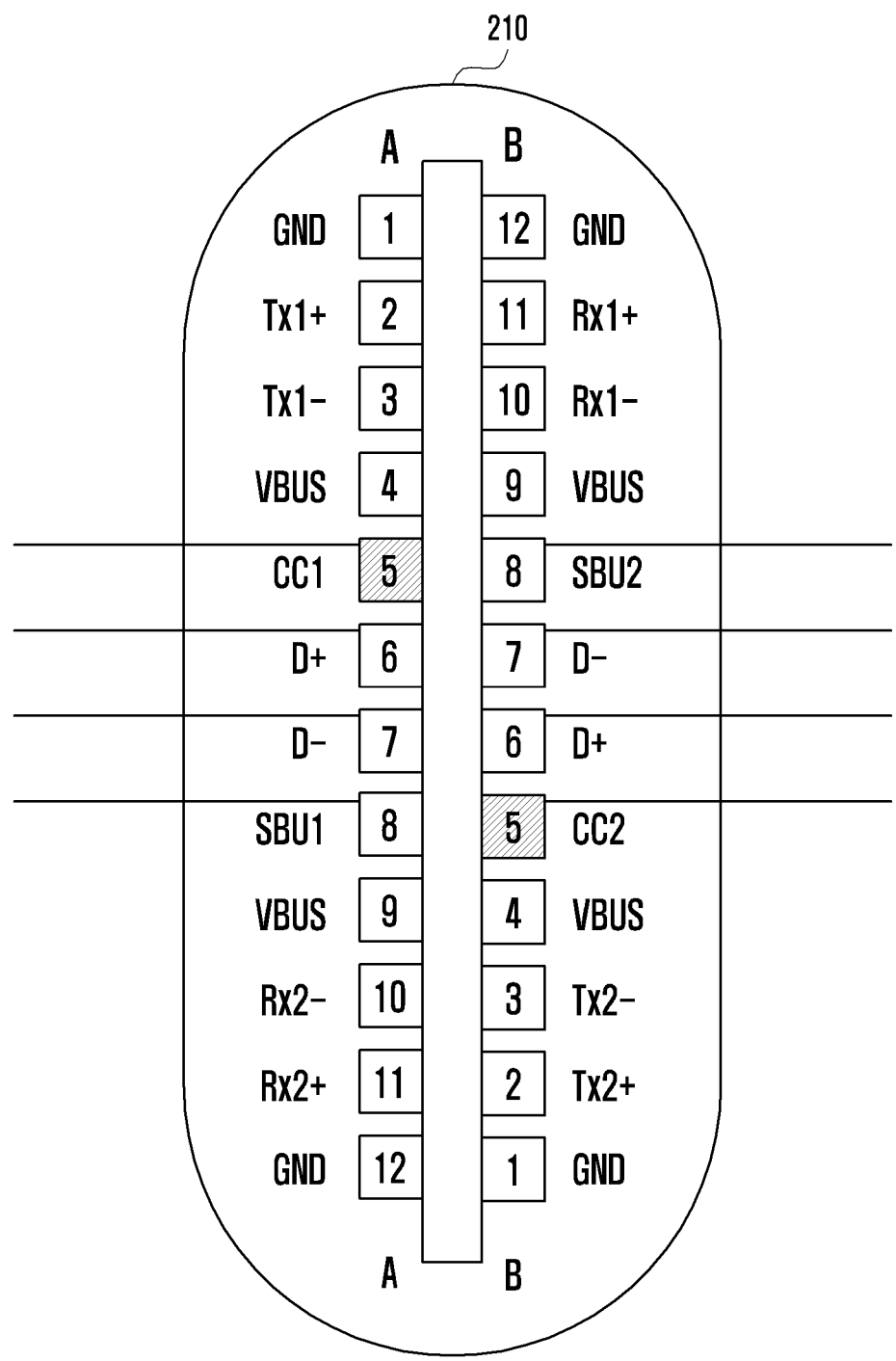

FIG. 3A and FIG. 3B illustrate a connector of an electronic device and the pin structure of the connector according to various embodiments. FIG. 3A illustrates the connector of the electronic device and a connector of an external electronic device. FIG. 3B illustrates the structure of a plurality of terminals (e.g., pins) included in the connector.

Referring to FIG. 3A, the connector 320 of the external electronic device may be inserted into the connector 210 of the electronic device 200. The external electronic device is not limited to a particular type and may include any external electronic device, such as a battery pack to supply power to the electronic device 200, a device to communicate with the electronic device 200, or an external memory connected to the electronic device 200.

The connector 320 of the external electronic device may be accommodated in a hole formed in the electronic device 200 to come in physical contact with the connector 210 of the electronic device 200 and may be electrically connected thereto by the physical contact. According to various embodiments, the connector 210 and the hole of the electronic device 200 may have a reversible structure. That is, the connector 210 may be symmetrical with respect to a first direction, which is perpendicular to a direction in which the external electronic device is inserted (e.g., a bottom-to-top direction of the electronic device 200), and a second direction, which is the opposite direction of the first direction.

Referring to FIG. 3A, the connector 310 of the external electronic device may be inserted into the connector 210 of the electronic device 200 in a direction in which one surface (e.g., surface A) of the connector 310 of the external electronic device is parallel with the front surface (e.g., a surface on which a display is disposed) of the electronic device 200, and the connector 310 of the external electronic device may likewise be inserted into the connector 210 of the electronic device 200 in a direction in which another surface (e.g., surface B) of the connector 320 of the external electronic device is parallel with the front surface of the electronic device 200. According to an embodiment, the connector 210 may include a plurality of terminals. According to an embodiment, when the connector 320 of the external electronic device is inserted in a different direction, terminals of the connector 320 of the external electronic device electrically connected to the respective terminals included in the connector 210 of the electronic device 200 may be different.

According to various embodiments, the connector 210 may be a connector in accordance with Universal Serial Bus (hereinafter, "USB") and may be specifically a Type-C connector corresponding to the USB Type-C standard. However, various embodiments of the disclosure are not limited to USB Type-C and may be applied to cable interfaces in accordance with various standards, such as High-Definition Multimedia Interface (HDMI), Recommended Standard 232 (RS-232), Power Line Communication, or Plain Old Telephone Service (POTS), or non-standard cable interfaces. Further, various embodiments of the disclosure may be applied to an interface for transmitting data (e.g., data transmitted through a configuration channel 1 (CC1) pin or a configuration channel 2 (CC2) pin included in the Type-C standard) available to automatically detect which devices are connected between a source (a device that supplies power) and a sink (a device that is supplied with power) or between a downstream facing port (DFP, a device that provides data) and an upstream facing port (UFP, a device that receives data).

FIG. 3B illustrates the pin structure of the connector of the electronic device according to various embodiments.

According to various embodiments, the connector of the electronic device (e.g., the electronic device 200 of FIG. 2) may correspond to the USB Type-C standard, and FIG. 3B shows a plurality of terminals that the connector can include when the connector of the electronic device 200 follows the USB Type-C standard. As shown in FIG. 3B, the USB Type-C connector may include 12 terminals on each of a left A line A and a right B line, and the terminals on the left A line and the terminals on the right B line may be symmetrical to each other.

According to an embodiment, the electronic device 200 may transmit a data signal through A6/B6 and A7/B7 terminals of the connector. The electronic device 200 (or the external electronic device) may transmit data to the external electronic device (or the electronic device 200) through the A6/B6 terminals (D+). A role of each terminal in various operation modes is defined according to the USB Type-C standard, and a description of the role of each terminal will be omitted.

According to an embodiment, when the electronic device 200 is connected with an external electronic device, the electronic device 200 may exchange an electrical signal (e.g., a digital ID or a resistance ID) with the external electronic device through a CC1 terminal and a CC2 terminal. The electronic device 200 may detect the type of the external electronic device connected through the connector based on a voltage value or a resistance value corresponding to the electrical signal. According to an embodiment, the electronic device 200 may detect moisture based on the CC1 terminal and the CC2 terminal of the connector. For example, the electronic device 200 may identify a resistance value corresponding to moisture, thereby detecting the moisture.

The electronic device according to various embodiments may transmit/receive data through the CC1 or CC2 terminal (hereinafter, collectively referred to as a CC pin) to/from the external electronic device connected through the USB Type-C connector. The CC pin may be used to automatically detect which devices are connected between a source (a device that supplies power) and a sink (a device that is supplied with power) or between a DFP (a device that provides data) and a UFP (a device that receives data).

Figure 4:
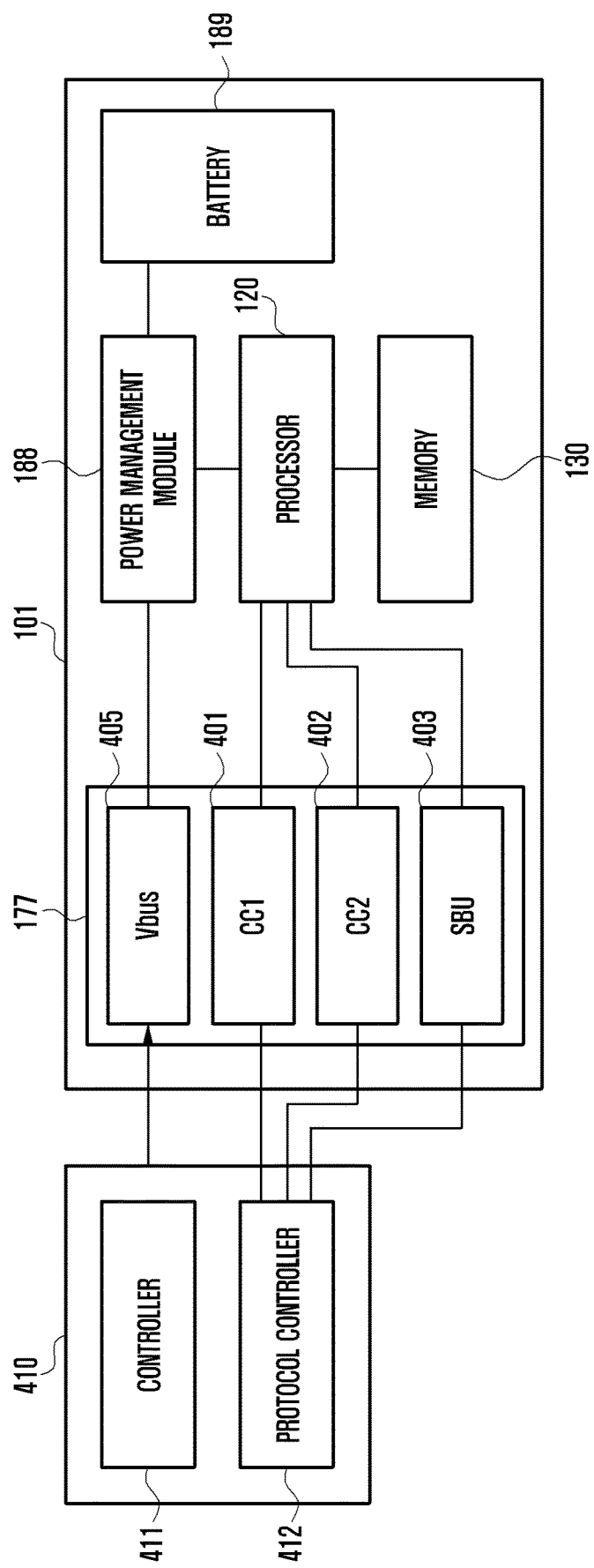
FIG. 4 is a block diagram illustrating an electronic device according to various embodiments.

FIG. 4 is a block diagram illustrating an electronic device according to various embodiments.

Referring to FIG. 4, the electronic device (e.g., the electronic device 101 of FIG. 1) may include a processor (e.g., the processor 120 of FIG. 1), an interface (e.g., the interface 177 of FIG. 1), a power management module (e.g., the power management module 188 of FIG. 1), and a battery (e.g., the battery 189 of FIG. 1). According to an embodiment, the interface 177 may include the connecting terminal 178 of FIG. 1. According to an embodiment, the interface 177 may include a USB Type-C connecting terminal corresponding to the USB Type-C standard, and the electronic device 101 may be connected with an external electronic device 410 (e.g., a charging device) through a USB Type-C connector. The external electronic device 410 may include a connector (e.g., the connector 320 of FIG. 3A) corresponding to the USB Type-C standard to be coupled to the interface 177 corresponding to the USB Type-C standard. According to an embodiment, the processor 120 of the electronic device 101 may identify the type of the connected external electronic device 410 through a CC1 terminal 401 and a CC2 terminal 402 provided in the interface 177. For example, the processor 120 may measure a voltage value and a resistance value corresponding to the external electronic device 410 through the CC1 terminal 401 and the CC2 terminal 402 and may identify the type of the external electronic device 410 (e.g., a data providing device or a power supply device (charging device)) based on the measured voltage value and resistance value.

According to various embodiments, the external electronic device 410 may include a controller 411 and a protocol controller 412. The controller 411 may at least partially control each component provided in the external electronic device 410. The protocol controller 412 may periodically transmit a set electrical signal. For example, the protocol controller 412 may transmit a set electrical signal under control of the controller 411 or may periodically transmit a set electrical signal without control of the controller 411. According to an embodiment, when the external electronic device 410 is connected to the electronic device 101, the controller 411 of the external electronic device 410 may detect connection with the electronic device 101 through the CC1 terminal 401 and the CC2 terminal 402 connected to the protocol controller 412. According to an embodiment, in response to the connection with the electronic device 101, the controller 411 of the external electronic device 410 may apply a set voltage (e.g., about 5V) to the electronic device 101. The electronic device 101 may be provided with a voltage from the external electronic device 410 through a Vbus terminal 405 provided in the interface 177. The processor 120 may control the power management module 188 to charge the battery 189 based on the provided voltage.

According to various embodiments, the processor 120 of the electronic device 101 may detect moisture (e.g., the CC1 terminal 401, the CC2 terminal 402, and an SBU terminal 403) based on at least one terminal provided in the interface 177. The SBU terminal 403 is a secondary bus terminal and may include an SBU1 terminal and an SBU2 terminal. According to an embodiment, the processor 120 may detect moisture in the interface 177 based on the SBU terminal 403. Hereinafter, a terminal used to detect moisture is described as being the CC1 terminal 401 or the CC2 terminal 402 for illustration but is not limited to the CC1 terminal 401 or the CC2 terminal 402. For example, the processor 120 may apply an electric current (e.g., an RP current source) corresponding to the CC1 terminal 401 and the CC2 terminal 402 (hereinafter, the CC1 terminal 401 and the CC2 terminal 402 may be referred to as a CC terminal 401 and 402) and may detect the state of the CC terminal 401 and 402 based on the applied electric current. For example, the processor 120 may identify whether the external electronic device 410 is connected or the type of the connected external electronic device 410 based on the CC terminal 401 and 402. According to an embodiment, when there is moisture in the CC terminal 401 and 402, the processor 120 may measure a resistance value corresponding to the moisture based on the CC terminal 401 and 402 and may detect whether there is the moisture in the CC terminal 401 and 402 based on the measured resistance value. According to various embodiments, when moisture is detected through the CC terminal 401 and 402, the processor 120 may switch at least one switch so that the CC terminal 401 and 402 is changed to an open state. The open state of the CC terminal 401 and 402 means that the CC terminal 401 and 402 is in a high-impedance (Z) state (e.g., a state in which a very high resistance value is applied) and may refer to a state in which no electrical signal is transmitted to or received by the CC terminal 401 and 402. When the CC terminal 401 and 402 is changed to the high-impedance (Z) state, the controller 411 of the external electronic device 410 may not supply power to the electronic device 101. According to an embodiment, the controller 411 of the external electronic device 410 may transmit an electrical signal to the CC terminal 401 and 402 of the electronic device 101, may identify connection to the electronic device 101 based on the electrical signal, and may supply power to the electronic device 101. When the CC terminal 401 and 402 of the electronic device 101 is in the high-impedance (Z) state, the external electronic device 410 cannot identify whether the external electronic device is connected to the electronic device 101 and may not supply power to the electronic device 101.

Figure 5:
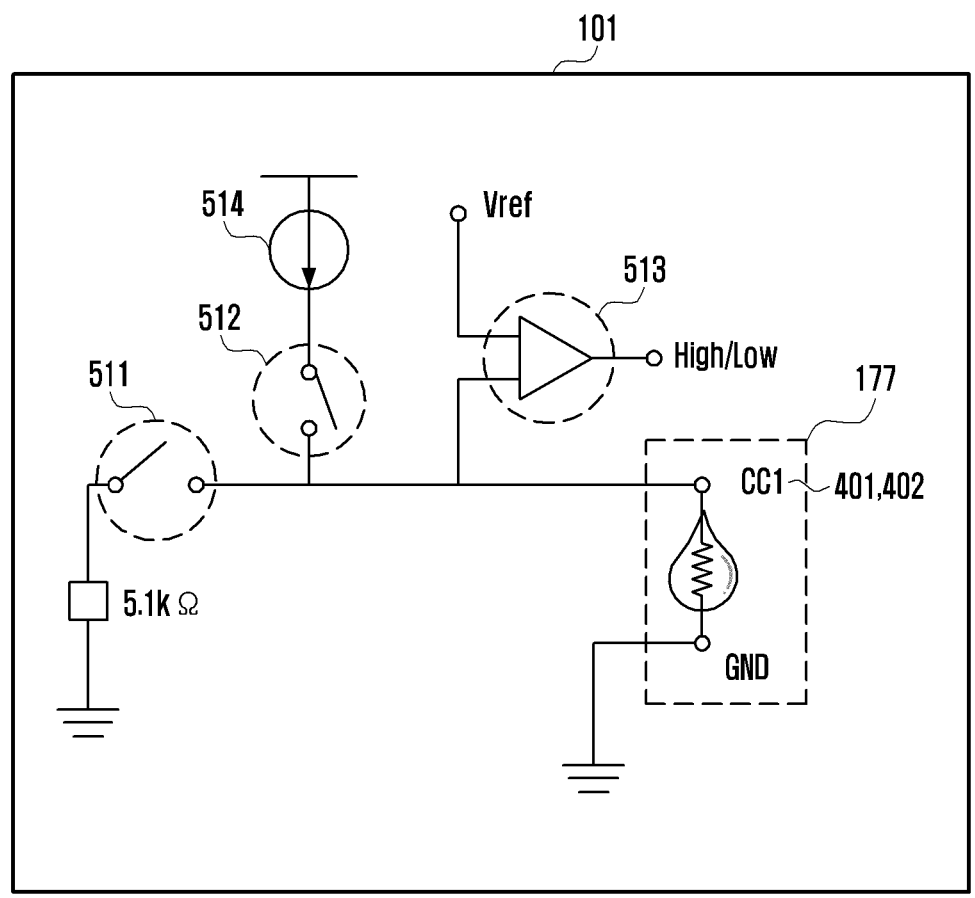
FIG. 5 is a circuit diagram illustrating an operation of controlling at least one switch in an interface of an electronic device according to various embodiments.

FIG. 5 is a circuit diagram illustrating an operation of controlling at least one switch in an interface of an electronic device according to various embodiments.

According to an embodiment, a processor 120 of the electronic device 101 may detect moisture based on at least one terminal (e.g., the CC1 terminal 401, the CC2 terminal 402, and the SBU terminal 403) provided in an interface 177. Referring to FIG. 5, although a CC terminal 401 and 402 is disclosed, the disclosure is not limited to the CC terminal 401 and 402. According to an embodiment, the processor 120 may detect moisture based on the CC terminal 401 and 402. According to an embodiment, the electronic device 101 may include a resistance measurement device (e.g., a resistor) for detecting a resistance value corresponding to moisture. The processor 120 may determine whether a resistance value corresponding to the CC terminal 401 and 402 is a resistance value corresponding to the moisture using the resistance measurement device.

According to an embodiment, the processor 120 may generally be supplied with power based on a current generator (e.g., a generator), and in a general situation (e.g., normal mode), a first switch 511 may be in an open state, and a second switch 512 may be in a close state. For example, the open state of a switch may be a state in which the switch is open and thus an electrical signal does not flow through the switch, and the closed state of a switch may be a state in which the switch is closed and thus an electrical signal flows through the switch. In the normal mode, the processor 120 may supply power to the CC terminal 401 and 402 from the current generator 514 (e.g., the generator) and may identify the Rp/Rd resistance value of an external electronic device (e.g., the external electronic device 410 of FIG. 4) using a comparator 513. According to an embodiment, the processor 120 may identify the type of the external electronic device 410 based on the Rp/Rd resistance value.

According to an embodiment, when the electronic device 101 is exposed to wetness, moisture may flow into the CC terminal 401 and 402, and the processor 120 may detect moisture based on the CC terminal 401 and 402. For example, when a resistance value corresponding to moisture is measured based on the CC terminal 401 and 402, the processor 120 may change the second switch 512 in the closed state to the open state. According to an embodiment, upon detecting moisture, the processor 120 may control at least one switch (e.g., change the second switch 512 from the closed state to the open state) so that the CC terminal 401 and 402 maintains a high-impedance state.

Figure 6:
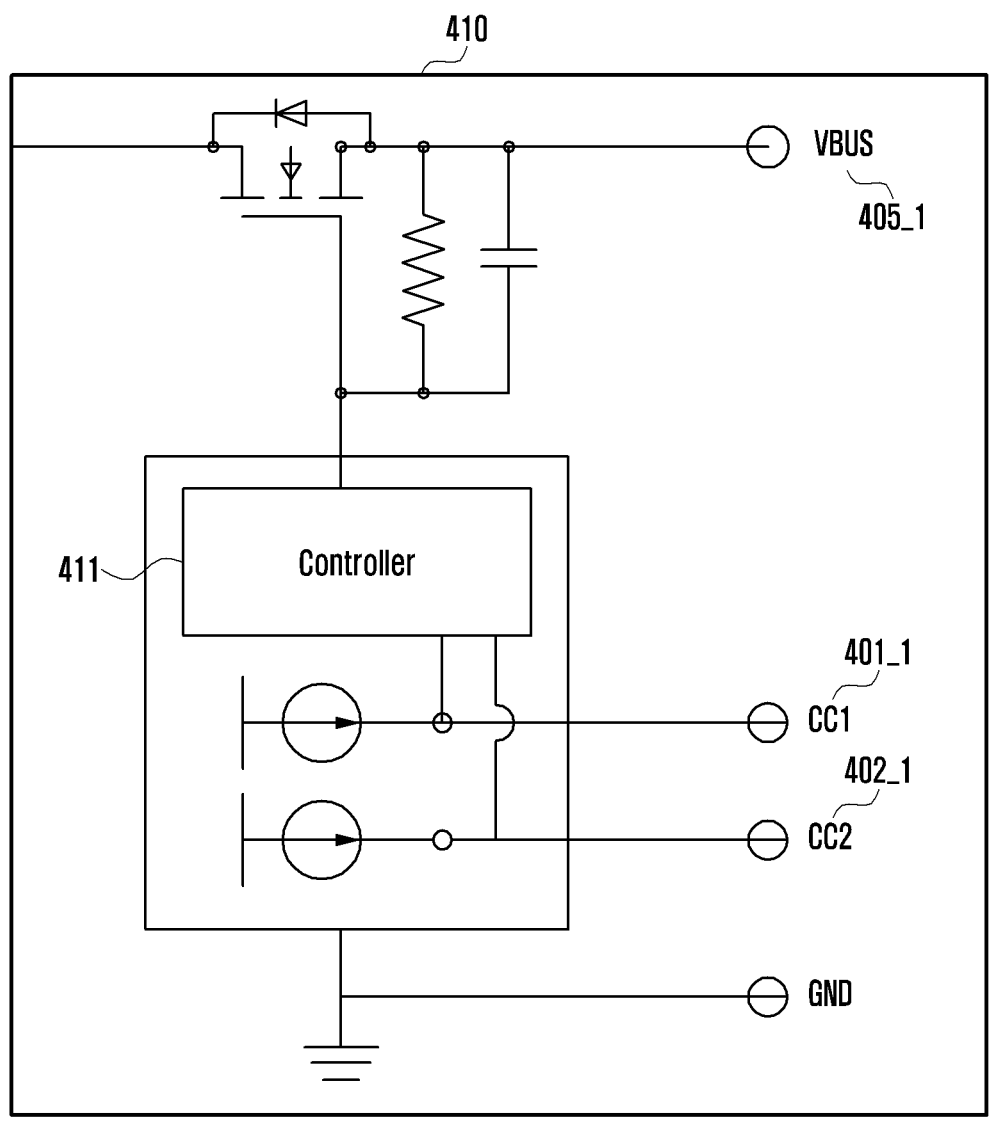
FIG. 6 is a circuit diagram illustrating an operation of an external electronic device connected to an electronic device according to various embodiments.

FIG. 6 is a circuit diagram illustrating an operation of an external electronic device connected to an electronic device according to various embodiments.

According to an embodiment, the external electronic device 410 may include a controller 411 and may include a connector (e.g., the connector 320 of FIG. 3A) connectable to the electronic device 101 corresponding to an interface 177 of the electronic device 101. According to an embodiment, the connector 320 may include at least one terminal (e.g., a CC1 terminal 401_1, a CC2 terminal 402_1, a Vbus terminal 405_1, and a GND terminal) in accordance with the USB Type-C standard. According to an embodiment, the controller 411 may transmit an electrical signal (e.g., a current source) to the CC1 terminal 401_1 and the CC2 terminal 402_1 and may measure impedance corresponding to a CC1 terminal 401 and a CC2 terminal 402 of the connected electronic device 101. According to an embodiment, the controller 411 may measure the impedance of the electronic device 101 based on the CC1 terminal 401_1 and the CC2 terminal 402_1 and may determine whether to apply a voltage to the Vbus terminal 405_1 based on the measured impedance. For example, when the impedance of the electronic device 101 corresponds to a high-impedance state, a voltage corresponding to the CC1 terminal 401_1 and the CC2 terminal 402_1 of the external electronic device 410 may exceed a reference value (e.g., a threshold value), and the controller 411 may not apply a voltage corresponding to the Vbus terminal 405_1. That is, the controller 411 may not apply a voltage to the electronic device 101.

According to various embodiments, when the connector 320 of the external electronic device 410 is connected to the interface 177 of the electronic device 101, the controller 411 of the external electronic device 410 may transmit an electrical signal to the electronic device 101 based on the CC1 terminal 401_1 and the CC2 terminal 402_1. The external electronic device 410 may detect whether the external electronic device 410 is connected to the electronic device 101 based on the CC1 terminal 401_1 and the CC2 terminal 402_1. For example, the controller 411 may measure impedance corresponding to the CC1 terminal 401_1 and the CC2 terminal 402_1 based on an electrical signal returned in response to the transmitted electrical signal. The controller 411 may determine whether to apply a voltage to the Vbus terminal 405_1 base on the measured impedance. For example, when the measured impedance corresponds to the high-impedance state, the controller 411 may not output a voltage through the Vbus terminal 405_1.

Figure 7A:
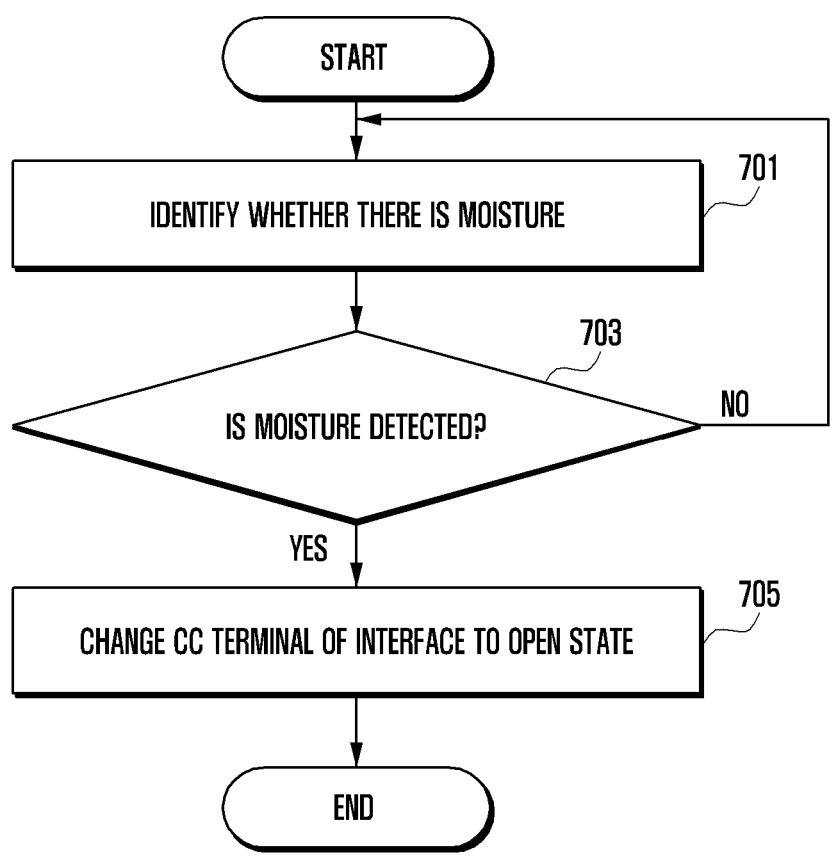
FIG. 7A and FIG. 7B are flowcharts illustrating a method for changing at least one pin in an interface to an open state in order to prevent corrosion by moisture according to various embodiments.
Figure 7B:
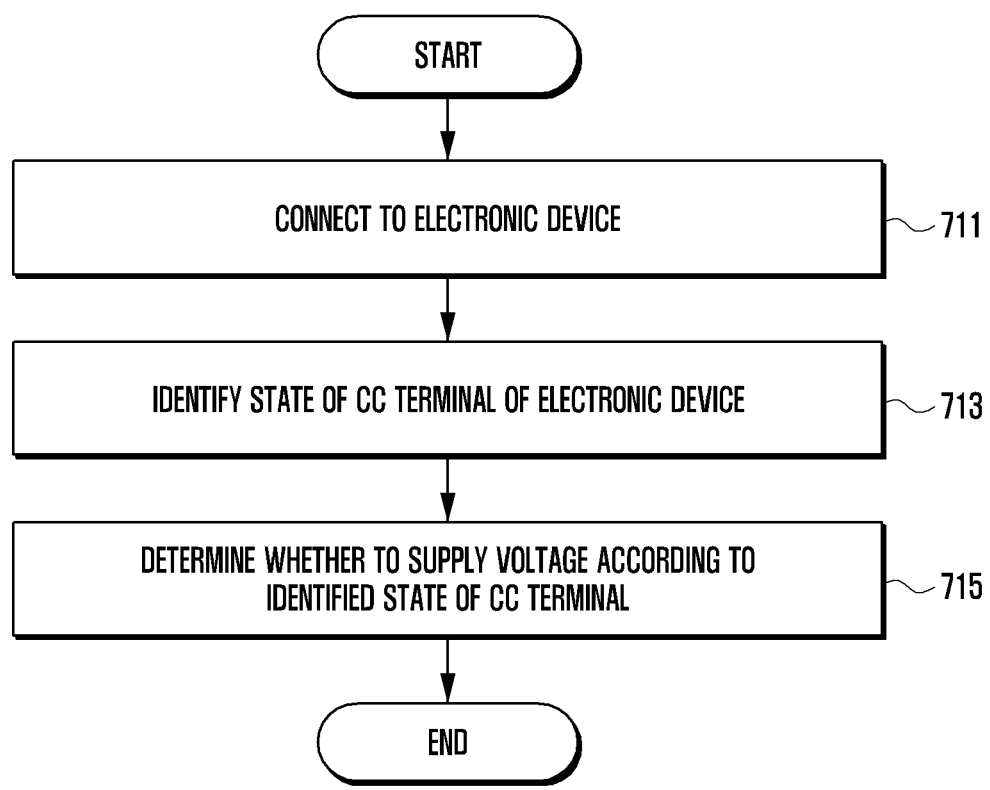

FIG. 7A and FIG. 7B are flowcharts illustrating a method for changing at least one pin in an interface to an open state in order to prevent corrosion by moisture according to various embodiments. FIG. 7A illustrates an operation performed by an electronic device to prevent corrosion, and FIG. 7B illustrates an operation performed by an external electronic device to prevent corrosion.

Referring to FIG. 7A, in operation 701, a processor (e.g., the processor 120 of FIG. 1) of the electronic device (e.g., the electronic device 101 of FIG. 1) may identify whether there is moisture in an interface (e.g., the interface 177 of FIG. 1). For example, when the electronic device 101 is exposed to wetness, moisture is highly likely to remain in the interface 177 in the form of a hole, and the processor 120 may identify whether there is moisture based on at least one terminal (e.g., a CC terminal (e.g., the CC1 terminal 401 and the CC2 terminal 402 of FIG. 4) and an SBU terminal (e.g., the SBU terminal 403 of FIG. 4)) provided in the interface 177. According to an embodiment, the interface 177 may include at least one terminal in accordance with the USB Type-C standard. For example, the interface 177 may include the CC terminal (e.g., the CC1 terminal 401 and the CC2 terminal 402 of FIG. 4) (hereinafter, the CC terminal includes a CC1 terminal 401 and a CC2 terminal 402) for identifying the type of a connected external electronic device (e.g., the external electronic device 410 of FIG. 4). The processor 120 may identify whether there is moisture based on the at least one terminal.

In operation 703, the processor 120 may determine whether moisture is detected. According to an embodiment, the electronic device 101 may measure a resistance value corresponding to the at least one terminal, and may determine that moisture is detected when the measured resistance value is a resistance value corresponding to moisture.

When moisture is detected in operation 703, the processor 120 may change the CC terminal 401 and 402 of the interface 177 to an open state in operation 705. For example, the processor 120 may change the state of the CC terminal 401 and 402 to the open state by switching on/off at least one switch. The open state of the CC terminal 401 and 402 means that the CC terminal 401 and 402 is in a high-impedance (Z) state and may refer to a state in which no electrical signal is transmitted to or received by the CC terminal 401 and 402. According to various embodiments, when moisture is detected in the interface 177, the processor 120 may change the state of the CC terminal 401 and 402 to the open state, and power may not be supplied from the external electronic device 410. For example, the external electronic device 410 may transmit an electrical signal to the CC terminal (e.g., the CC1 terminal 401_1 and the CC2 terminal 402_1 of FIG. 6), thereby determining whether the external electronic device 410 is connected to the electronic device 101. When the CC terminal 401 and 402 is changed to the open state, the CC terminal 401 and 402 is in the high-impedance state, and the external electronic device 410 may determine that the external electronic device 410 is not connected to the electronic device 101. That is, the external electronic device 410 may not supply power to the electronic device 101. According to various embodiments, since power is not supplied from the external electronic device 410, corrosion of the at least one terminal provided in the interface 177 may be prevented.

Referring to FIG. 7B, in operation 711, the external electronic device (e.g., the external electronic device 410 of FIG. 4) may be connected to an electronic device 101. For example, the external electronic device 410 may be connected to an interface 177 of the electronic device 101 using a connector (e.g., the connector 320 of FIG. 3A) in accordance with the USB Type-C standard.

In operation 713, the external electronic device 410 may identify the state of a CC terminal 401 and 402 provided in the interface 177 of the electronic device 101. According to an embodiment, a controller (e.g., the controller 411 of FIG. 4) of the external electronic device 410 may periodically transmit an electrical signal to a CC terminal (e.g., the CC1 terminal 401_1 and the CC2 terminal 402_1 of FIG. 6) provided in a connector 320. The controller 411 may identify the state of the CC terminal 401 and 402 of the electronic device 101 based on the electrical signal. For example, the controller 411 may measure a resistance value (e.g., an Rd resistance value and an Rp resistance value) corresponding to the CC terminal 401 and 402 and may determine whether to supply power to the electronic device 101 based on the measured resistance value. For example, when the resistance value corresponding to the CC terminal 401 and 402 corresponds to high impedance, the controller 411 may not supply power to the electronic device 101, and when the resistance value falls within a set range, the controller 411 may supply power (e.g., about 5 V) to the electronic device 101.

In operation 715, the external electronic device 410 may determine whether to supply a voltage to the electronic device 101 according to the identified state of the CC terminal 401 and 402. According to an embodiment, when the CC terminal 401 and 402 is in the high-impedance state, the external electronic device 410 may not supply power to the electronic device 101.

Figure 8:
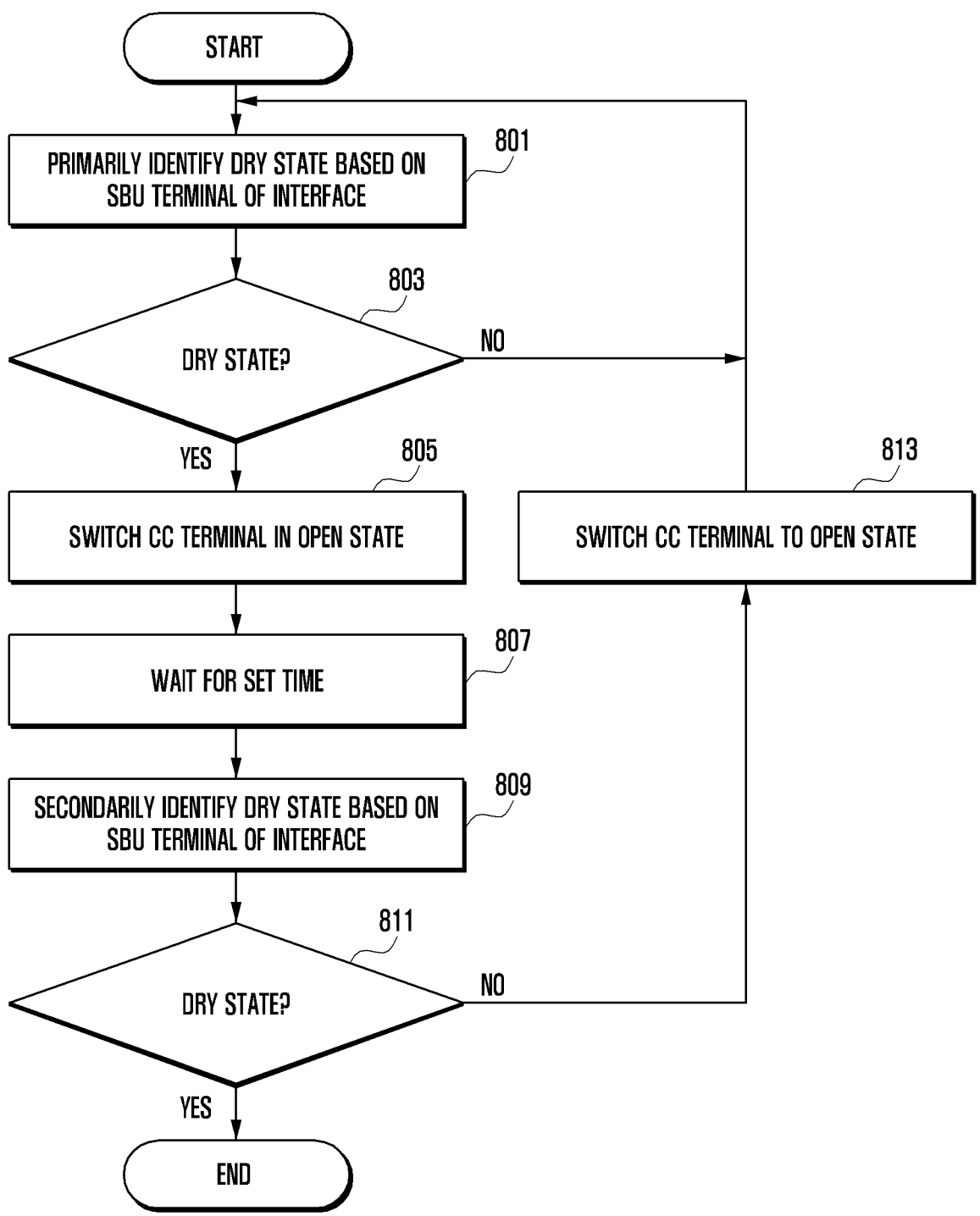
FIG. 8 is a flowchart illustrating a method for supplying an electric current to at least one pin in an open state in response to a dry state according to various embodiments.

FIG. 8 is a flowchart illustrating a method for supplying an electric current to at least one pin in an open state in response to a dry state according to various embodiments.

Referring to FIG. 8, in operation 801, a processor (e.g., the processor 120 of FIG. 1) of an electronic device (e.g., the electronic device 101 of FIG. 1) may primarily identify whether moisture has evaporated (e.g., a dry state) based on an SBU terminal (e.g., the SBU terminal 403 of FIG. 4) provided in an interface (e.g., the interface 177 of FIG. 1). According to an embodiment, a terminal for identifying whether moisture has evaporated is not limited to the SBU terminal 403 and may include at least one terminal provided in the interface.

In operation 803, the processor 120 may determine whether moisture has evaporated. For example, the processor 120 may measure a resistance value corresponding to the SBU terminal 403, and may determine whether moisture has evaporated when the measured resistance value does not match a resistance value corresponding to moisture. When moisture has not evaporated (when moisture has been detected) in operation 803, the processor 120 may return to operation 801.

When moisture has evaporated in operation 803, the processor 120 may switch at least one switch so that an electric current is supplied to a CC terminal 401 and 402 in an open state in operation 805. According to an embodiment, the processor 120 may maintain the CC terminal 401 and 402 in the open state to prevent corrosion due to moisture until determining whether moisture has evaporated. In operation 805, the processor 120 may control the at least one switch so that an electric current is supplied to the CC terminal 401 and 402 in the open state. For example, the processor 120 may control the at least one switch so that a current generator is connected to the CC terminal 401 and 402.

In operation 807, the processor 120 may wait for a set time. The order in which operation 805 and operation 807 are performed may be reversed. For example, the processor 120 may wait for the set time and may then control the at least one switch to supply the current generator to the CC terminal 401 and 402 in the open state. In operation 809, the processor 120 may secondarily identify whether moisture has evaporated (e.g., a dry state) based on the SBU terminal 403 provided in the interface 177. When a voltage is applied to the electronic device 101 without evaporating moisture, the electronic device 101 is corroded, and thus a process for identifying whether moisture has evaporated may be performed twice.

In operation 811, the processor 120 may determine whether moisture has evaporated. For example, the processor 120 may measure a resistance value corresponding to the SBU terminal 403, and may determine whether moisture has evaporated when the measured resistance value does not match a resistance value corresponding to moisture.

When moisture has not evaporated (when moisture has been detected) in operation 811, the processor 120 may control the at least one switch to change the CC terminal 401 and 402 to which the current generated is supplied to the open state again in operation 813 and may return to operation 801.

FIG. 9A to FIG. 9E illustrate a method for providing a notification in response to detection of moisture according to various embodiments.

Figure 9A:
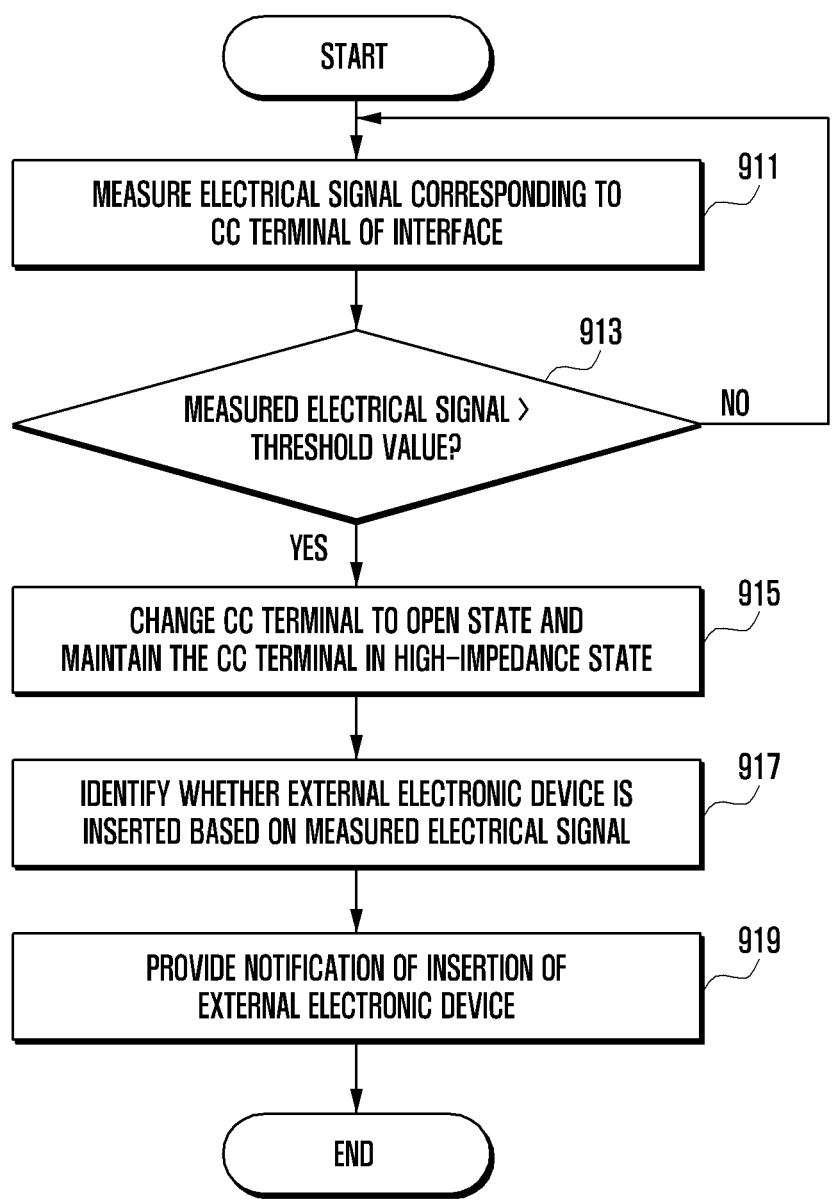
FIG. 9A to FIG. 9E illustrate a method for providing a notification in response to detection of moisture according to various embodiments.
Figure 9B:
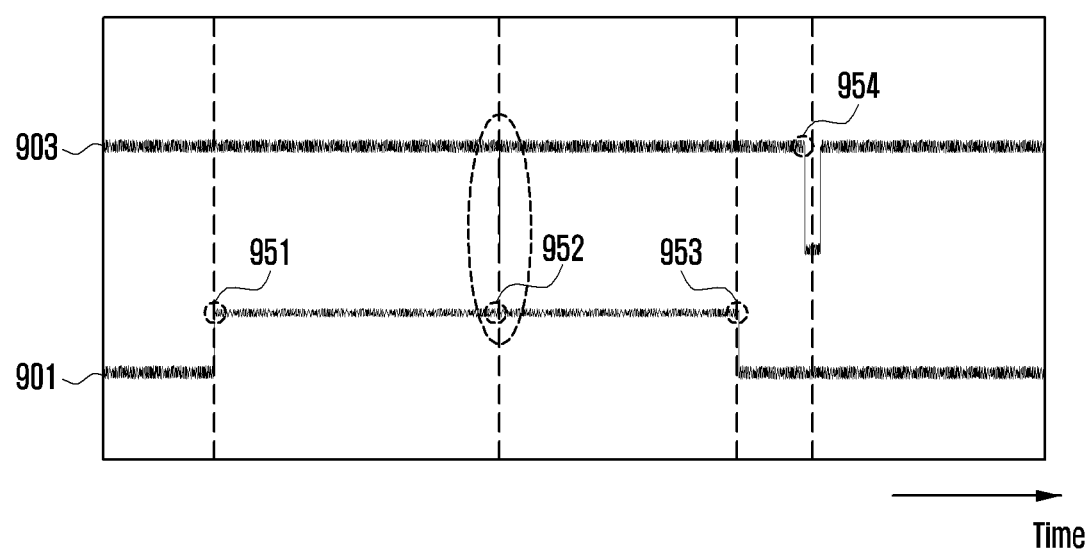

FIG. 9A and FIG. 9B illustrate a first embodiment in which a notification is provided in response to detection of moisture. FIG. 9A is a flowchart illustrating the first embodiment, and FIG. 9B illustrates a process of blocking an electrical signal to at least one terminal according to the first embodiment.

Referring to FIG. 9A, in operation 911, a processor 120 of an electronic device 101 may measure an electrical signal corresponding to a CC terminal 401 and 402 provided in an interface 177. For example, the processor 120 may measure a voltage value or a resistance value corresponding to the CC terminal 401 and 402 using a comparator (e.g., the comparator 513 of FIG. 5).

In operation 913, the processor 120 may compare the measured electrical signal with a set threshold value. For example, the threshold value may be a reference value for preventing corrosion and may be set by a manufacturer. Data about the threshold value may be stored in a memory (e.g., the memory 130 of FIG. 1). According to an embodiment, the electronic device 101 may store a voltage value or a resistance value corresponding to moisture in the memory 130. According to an embodiment, the electronic device 101 may store, in the memory 130, data about a voltage value, a current value, or a resistance value corresponding to an external electronic device connectable when moisture is detected.

When the measured electrical signal exceeds the threshold value in operation 913, the processor 120 may change the state of the CC terminal 401 and 402 to an open state and may maintain the CC terminal 401 and 402 in a high-impedance state in operation 915.

In operation 917, the processor 120 may identify whether the external electronic device 410 is inserted based on the measured electrical signal. For example, the processor 120 may determine whether the external electronic device 410 is inserted based on the voltage value or the resistance value measured in operation 911.

In operation 919, the processor 120 may provide a notification of insertion of the external electronic device 410 when determining that the external electronic device 410 is inserted. For example, the processor 120 may display a notification message on a display device (e.g., the display device 160 of FIG. 1) or may output a notification sound through a sound output device (e.g., the sound output device 170 of FIG. 1). According to an embodiment, the processor 120 may provide a notification of connection of the external electronic device 410 based on at least one component of the electronic device 101.

Referring to FIG. 9B, the processor 120 may apply an electrical signal to a CC terminal 901 (e.g., the CC1 terminal 401 and the CC2 terminal 402 of FIG. 4) at a first time 951. For example, at the first time 951, the CC terminal 901 may be connected to a current generator (e.g., the current generator 514 of FIG. 5) so that a set electric signal from the current generator 514 may flow thereto. While the electrical signal is applied to the CC terminal 901, the electronic device 101 may happen to be exposed to water. The processor 120 may detect moisture on the CC terminal 901 at a second time 952 and may block the electrical signal to the CC terminal 901 at a third time 953. For example, the processor 120 may control at least one switch disposed between the CC terminal 901 and the current generator 514, thereby blocking the electrical signal to the CC terminal 901. According to an embodiment, the processor 120 may generate an interruption signal 903 so that a voltage is not applied from the connected external electronic device 410 at a fourth time 954.

Figure 9C:
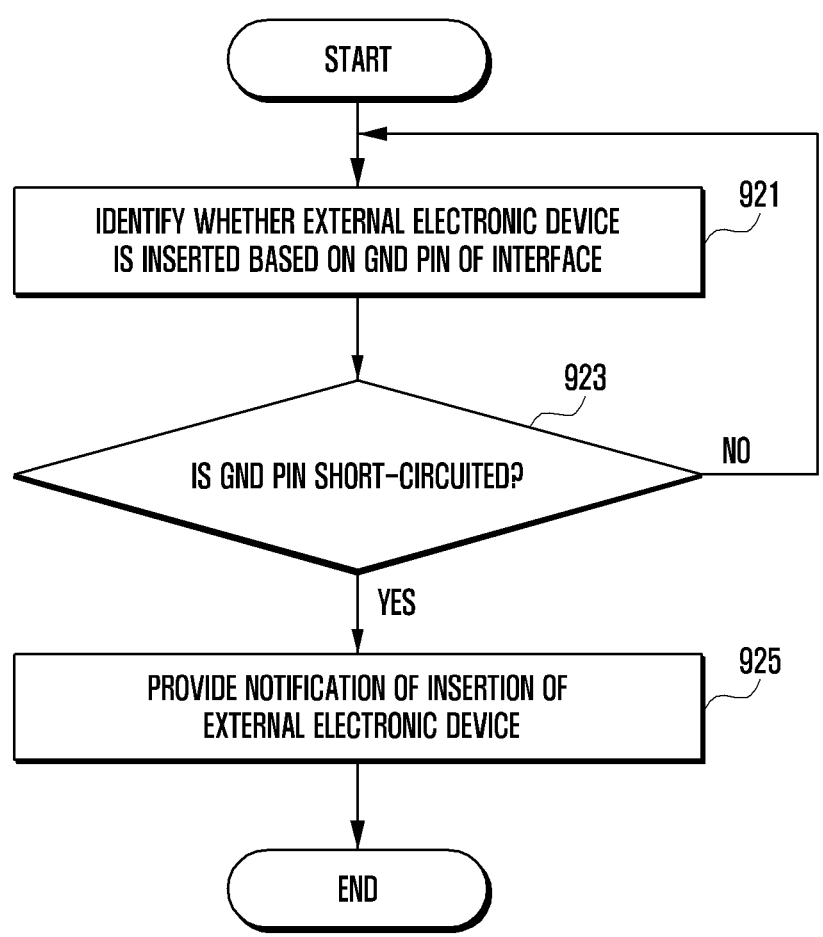

FIG. 9C illustrates a second embodiment in which a notification is provided in response to detection of moisture. Specifically, FIG. 9C is a flowchart illustrating the embodiment of identifying whether an external electronic device is inserted based on a GND terminal with moisture detected and providing a notification of insertion of the external electronic device.

Referring to FIG. 9C, in operation 921, a processor 120 may identify whether an external electronic device 410 is inserted based on a GND pin (e.g., a latch pin) provided in an interface 177. According to an embodiment, the GND pin may be a physical pin (button) at least partially disposed on the interface 177, and when the external electronic device 410 is inserted through the interface 177, the GND pin may be ON/OFF (short-circuited/not short-circuited). The processor 120 may determine whether the external electronic device 410 is inserted based on the GND pin.

In operation 923, the processor 120 may determine whether the GND pin is short-circuited. When it is identified that the GND pin is short-circuited in operation 923, the processor 120 may provide a notification of insertion of the external electronic device 410 to a user in operation 925.

Figure 9D:
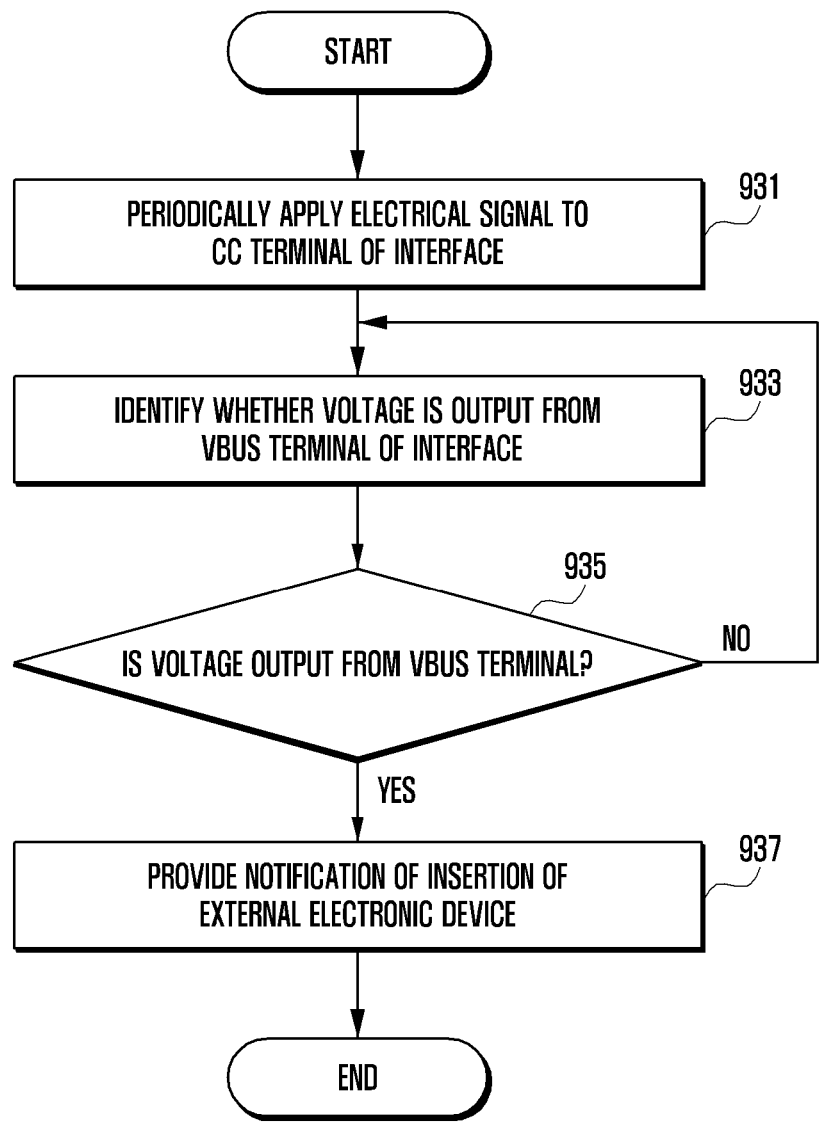

FIG. 9D illustrates a third embodiment in which a notification is provided in response to detection of moisture. Referring to FIG. 9D, a processor 120 may periodically apply an electrical signal to a CC terminal with moisture detected and may determine whether a voltage is applied based on a Vbus terminal. When a voltage corresponding to the Vbus terminal is detected, the processor 120 may determine that an external electronic device is inserted and may provide a notification of insertion of the external electronic device.

Referring to FIG. 9D, in operation 931, the processor 120 of an electronic device 101 may periodically apply an electrical signal to a CC terminal 401 and 402 provided in an interface 177. For example, the processor 120 may apply the electrical signal to the CC terminal 401 and 402 in an open state based on a set time interval. The processor 120 may periodically apply the electrical signal according to the set time interval. According to an embodiment, when the electrical signal is instantaneously applied to the CC terminal 401 and 402 with an external electronic device 410 connected to the electronic device 101, the external electronic device 410 may transmit a voltage to the electronic device 101 at a time of applying the electrical signal.

In operation 933, the processor 120 may identify whether a voltage is output from a Vbus terminal (e.g., the Vbus terminal 405 of FIG. 4) provided in the interface 177. For example, when a voltage is output through the Vbus terminal 405, the processor 120 may determine that the external electronic device 410 is connected to output the voltage.

When a voltage is output from the Vbus terminal 405 in operation 935, the processor 120 may determine that the external electronic device 410 is inserted, and may provide a notification of insertion of the external electronic device 410 in operation 937.

Figure 9E:
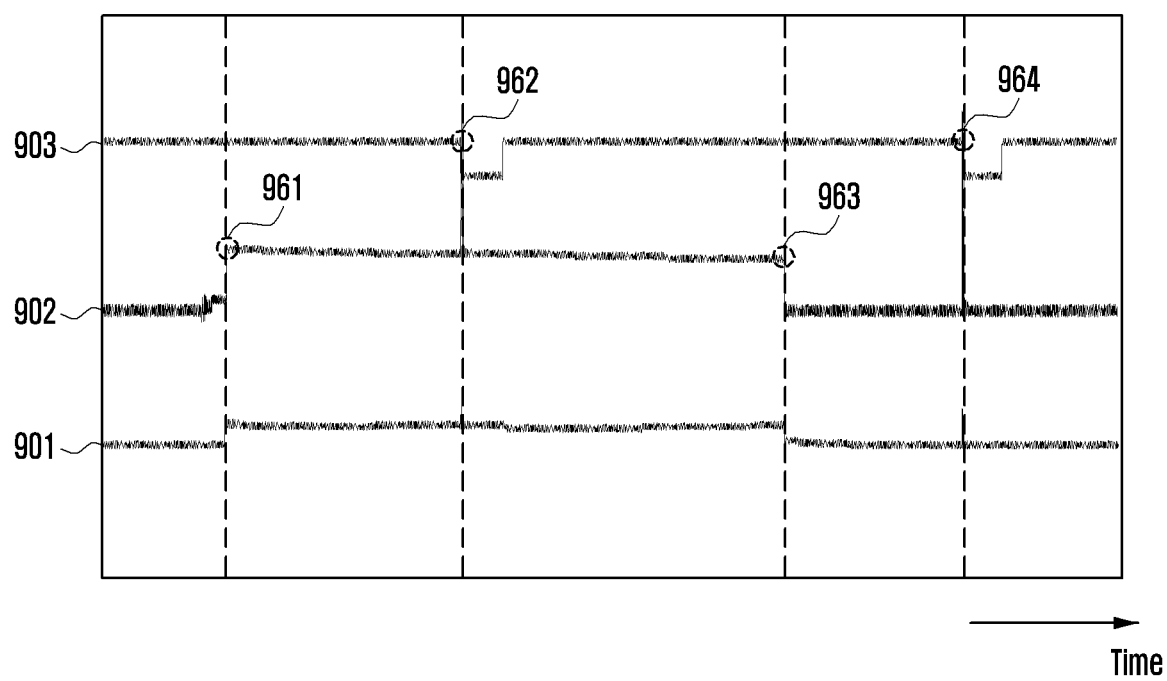

FIG. 9E illustrates a fourth embodiment in which a notification is provided in response to detection of moisture. Specifically, FIG. 9E is a graph illustrating an electrical signal to at least one terminal according to the fourth embodiment.

Referring to FIG. 9E, an electronic device 101 is in a state of being exposed to moisture, and at least one terminal may be connected to another adjacent terminal due to the moisture. A processor 120 may apply an electrical signal to at least one terminal (e.g., the CC terminal 901 or the SBU terminal 902) provided in an interface 177, and the electrical signal may be abandoned to a different terminal due to the moisture. For example, the processor 120 may apply an electrical signal to the CC terminal 901 (e.g., the CC1 terminal 401 and the CC2 terminal 402 of FIG. 4) at a first time 961. The CC terminal 901 and the SBU terminal 902 (e.g., the SUB terminal 403 in FIG. 4) may be electrically connected due to the moisture, and the electrical signal applied to the CC terminal 901 may also be applied to the SBU terminal 902. That is, the electrical signal may at least partially flow in the CC terminal 901 and the SBU terminal 902 at the first time 961. The processor 120 may identify whether there is the moisture based on the electrical signal applied to the CC terminal 901 and the SBU terminal 902. The processor 120 may generate an interruption signal 903 to the CC terminal 901 and the SBU terminal 902 at a second time 962, and may block the electrical signal to the CC terminal 901 and the SBU terminal 902 at a third time 963. According to an embodiment, the processor 120 may transmit an interruption signal 903 at a fourth time 964 so that a voltage is not applied from the connected external electronic device 410 connected.

An electronic device (e.g., the electronic device 101 of FIG. 1) according to various embodiments of the disclosure may include: a housing; an interface (the interface 177 of FIG. 1) configured to be connected to the housing or to be exposed through the housing, and to include at least one configuration channel (CC) pin (e.g., the CC1 terminal 401 and the CC2 terminal 402 of FIG. 4); a circuit configured to be disposed in the housing, to include a current generator (e.g., the current generator 514 of FIG. 5) and a comparator (e.g., the comparator 513 of FIG. 5), and to be electrically connected to the interface 177; a processor (e.g., the processor 120 of FIG. 1) configured to be disposed in the housing and to be operatively connected to the interface 177 and the circuit; and a memory (e.g., the memory 130 of FIG. 1) configured to be operatively connected to the processor 120. The memory 130 may cause the processor 120, when executed, to detect moisture corresponding to the at least one CC pin 401 and 402 based on the comparator 513 in a state in which the at least one CC pin 401 and 402 is connected to the current generator 514 and to switch the at least one CC pin 401 and 402 not to be connected with the current generator 514 by controlling at least one switch (e.g., the second switch 512 of FIG. 5) disposed between the current generator 514 and the at least one CC pin upon detecting the moisture.

According to various embodiments, the processor 120 may measure a voltage value or a resistance value corresponding to the at least one CC pin 401 and 402 based on the comparator 513 and may detect the moisture based on the measured voltage value or resistance value.

According to various embodiments, the processor 120 may measure an electrical signal corresponding to the at least one CC pin 401 and 402 based on the comparator 513, may identify whether the measured electrical signal exceeds a threshold value, and may change the at least one CC pin 401 and 402 to an open state by controlling the at least one switch 512 disposed between the current generator 514 and the at least one CC pin 401 and 402 when the measured electrical signal exceeds the threshold value.

According to various embodiments, the processor 120 may maintain the at least one CC pin 401 and 402 in a high-impedance state by controlling the at least one switch 512 so that the at least one CC pin 401 and 402 is not connected to the current generator 514.

According to various embodiments, the processor 120 may measure an electrical signal corresponding to the at least one CC pin 401 and 402 based on the comparator 513, may identify whether an external electronic device (e.g., the external electronic device 410) is inserted through the interface 177 based on the measured electrical signal, and may provide a notification of insertion of the external electronic device 410.

According to various embodiments, the processor 120 may identify whether an external electronic device 410 is inserted through the interface 177 based on a GND pin included in the interface 177 and may provide a notification of insertion of the external electronic device 410.

According to various embodiments, the processor 120 may periodically apply an electrical signal to the at least one CC pin 401 and 402, may determine whether a voltage is output from a Vbus terminal (e.g., the Vbus terminal 405 of FIG. 4) included in the interface 177, may detect whether an external electronic device 410 is inserted based on output of the voltage from the Vbus terminal 405, and may provide a notification of insertion of the external electronic device 410.

According to various embodiments, the processor 120 may identify whether moisture is evaporated based on an SBI pin included in the interface 177 based on the comparator 513, may control the at least one switch 512 to connect the at least one CC pin 401 and 402 with the current generator 514 in response to evaporation of the moisture, and may re-identify whether moisture is evaporated based on the SBI pin after a lapse of a certain time.

An external electronic device 410 according to various embodiments may include: a connector (e.g., the connector 320 of FIG. 3A) configured to be electrically connectable corresponding to at least one CC pin 401 and 402 included in an interface 177 of an electronic device 101; a circuit configured to be electrically connected to the connector 320; and a processor (e.g., the controller 411 of FIG. 4) configured to be operatively connected to the connector 320 and the circuit. The processor may measure an electrical signal corresponding to the at least one CC pin 401 and 402 of the electronic device 101 and may determine whether to supply a voltage to the electronic device 101 in response to the measured electrical signal.

According to various embodiments, the processor 411 of the external electronic device 410 may block supply of the voltage to the electronic device 101 when the electrical signal corresponding to the at least one CC pin 401 and 402 is in a high-impedance state.

An operating method of an electronic device 101 according to various embodiments of the disclosure may include: detecting moisture corresponding to at least one CC pin 401 and 402 included in an interface 177 based on a comparator 513 included in a circuit electrically connected to the interface 177 in a state in which the at least one CC pin 401 and 402 is connected to a current generator 514; controlling at least one switch 512 disposed between the current generator 514 and the at least one CC pin 401 and 402 upon detecting the moisture; and switching the at least one CC pin 401 and 402 not to be connected with the current generator 514.

The invention claimed is:
1. An electronic device comprising:
a housing;
an interface configured to be connected to the housing or to be exposed through the housing, and to comprise at least one configuration channel (CC) pin;
a circuit configured to be disposed in the housing, to comprise a current generator and a comparator, and to be electrically connected to the interface;
at least one switch disposed between the current generator and the at least one CC pin;
a processor configured to be disposed in the housing and to be operatively connected to the interface and the circuit; and
a memory configured to be operatively connected to the processor,
wherein the memory stores instructions that, when executed, cause the processor to:
detect moisture corresponding to the at least one CC pin based on the comparator in a state in which the at least one CC pin is connected to the current generator,
control the at least one switch not to connect the at least one CC pin with the current generator upon detecting the moisture,
identify whether the moisture has evaporated based on a secondary bus (SBU) pin included in the interface, and
control, in response to the moisture having evaporated, the at least one switch to connect the at least one CC pin with the current generator.
2. The electronic device as claimed in claim 1, wherein the instructions cause the processor to:
measure a voltage value or a resistance value corresponding to the at least one CC pin based on the comparator, and
detect the moisture based on the measured voltage value or resistance value.
3. The electronic device as claimed in claim 1, wherein the instructions cause the processor to:
measure an electrical signal corresponding to the at least one CC pin based on the comparator,
identify whether the measured electrical signal exceeds a threshold value, and
change the at least one CC pin to an open state by controlling the at least one switch disposed between the current generator and the at least one CC pin when the measured electrical signal exceeds the threshold value.
4. The electronic device as claimed in claim 1, wherein the instructions cause the processor to maintain the at least one CC pin in a high-impedance state by controlling the at least one switch so that the at least one CC pin is not connected to the current generator.
5. The electronic device as claimed in claim 1, wherein the instructions cause the processor to:
measure an electrical signal corresponding to the at least one CC pin based on the comparator,
identify whether an external electronic device is inserted through the interface based on the measured electrical signal, and
provide a notification of insertion of the external electronic device.
6. The electronic device as claimed in claim 1, wherein the instructions cause the processor to:
identify whether an external electronic device is inserted through the interface based on a ground (GND) pin included in the interface, and
provide a notification of insertion of the external electronic device.
7. The electronic device as claimed in claim 1, wherein the instructions cause the processor to:
periodically apply an electrical signal to the at least one CC pin,
determine whether a voltage is output from a Vbus terminal included in the interface,
detect whether an external electronic device is inserted based on output of the voltage from the Vbus terminal, and provide a notification of insertion of the external electronic device.

8. The electronic device as claimed in claim 1, wherein the instructions cause the processor to:
 re-identify whether the moisture has evaporated based on the SBU pin after a lapse of a certain time, and
 control, in response to detection of the moisture, the at least one switch not to connect the at least one CC pin with the current generator.

9. An operating method of an electronic device, the operating method comprising:
 detecting moisture corresponding to at least one configuration channel (CC) pin included in an interface based on a comparator included in a circuit electrically connected to the interface in a state in which the at least one CC pin is connected to a current generator;
 controlling at least one switch not to connect the at least one CC pin with the current generator upon detecting the moisture, wherein the at least one switch is disposed between the current generator and the at least one CC pin;
 identifying whether the moisture has evaporated based on a secondary bus (SBU) pin included in the interface; and
 controlling, in response to the moisture having evaporated, the at least one switch to connect the at least one CC pin with the current generator.

10. The operating method as claimed in claim 9, wherein the detecting of the moisture comprises:
 measuring a voltage value or a resistance value corresponding to the at least one CC pin based on the comparator; and
 detecting the moisture based on the measured voltage value or resistance value.

11. The operating method as claimed in claim 9, wherein controlling the at least one switch not to connect the at least one CC pin with the current generator comprises:
 measuring an electrical signal corresponding to the at least one CC pin based on the comparator;
 identifying whether the measured electrical signal exceeds a threshold value; and
 changing the at least one CC pin to an open state by controlling the at least one switch disposed between the current generator and the at least one CC pin when the measured electrical signal exceeds the threshold value.

12. The operating method as claimed in claim 9, wherein controlling the at least one switch not to connect the at least one CC pin with the current generator comprises maintaining the at least one CC pin in a high-impedance state by controlling the at least one switch so that the at least one CC pin is not connected to the current generator.

13. The operating method as claimed in claim 9, further comprising:
 re-identifying whether the moisture has evaporated based on the SBU pin after a lapse of a certain time; and
 controlling, in response to detection of the moisture, the at least one switch not to connect the at least one CC pin with the current generator.

14. The operating method as claimed in claim 9, further comprising:
 measuring, by an external electronic device connected to the electronic device through a connector corresponding to the interface, an electrical signal corresponding to the at least one CC pin; and
 determining, by the external electronic device, whether to supply a voltage to the electronic device in response to the measured electrical signal.

15. The operating method as claimed in claim 14, further comprising blocking supply of the voltage to the electronic device when the electrical signal corresponding to the at least one CC pin is in a high-impedance state.

* * * * *